Oct. 18, 1966 W. E. CHANCE 3,279,226
FASTENERS FOR BOXES AND THE LIKE
Filed Oct. 8, 1964 2 Sheets-Sheet 1
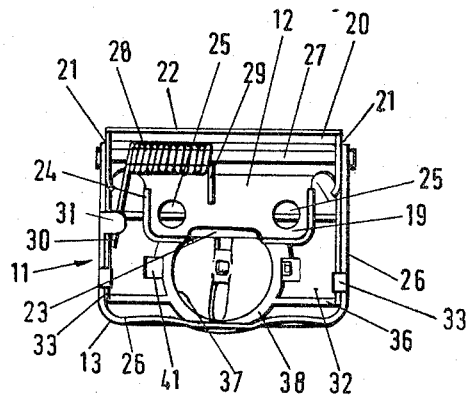
FIG.1
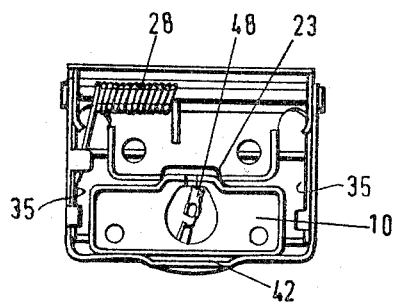
FIG.2
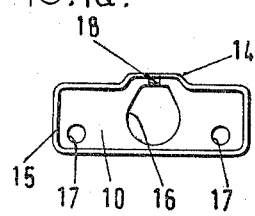
FIG.1a.
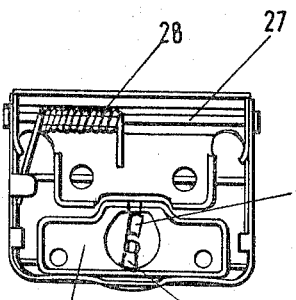
FIG.3
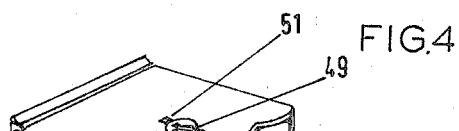
FIG.4
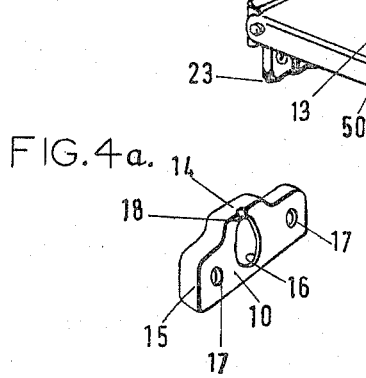
FIG.4a.
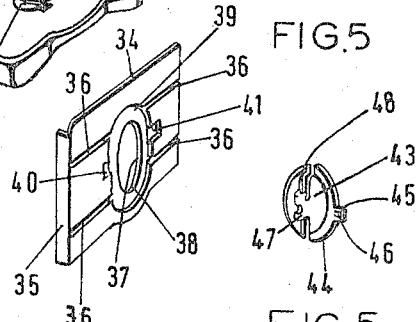
FIG.5
FIG.5a.
INVENTOR:
WILLIAM ERNEST CHANCE
BY Harry Ernest Rubens
ATTORNEY

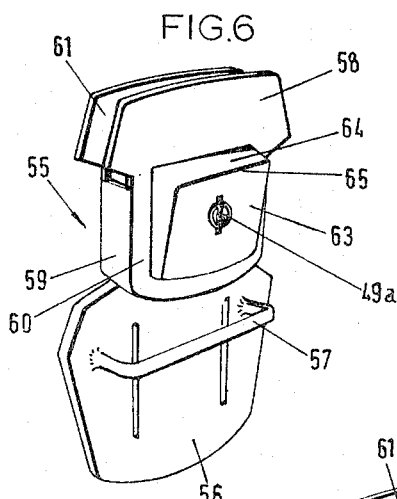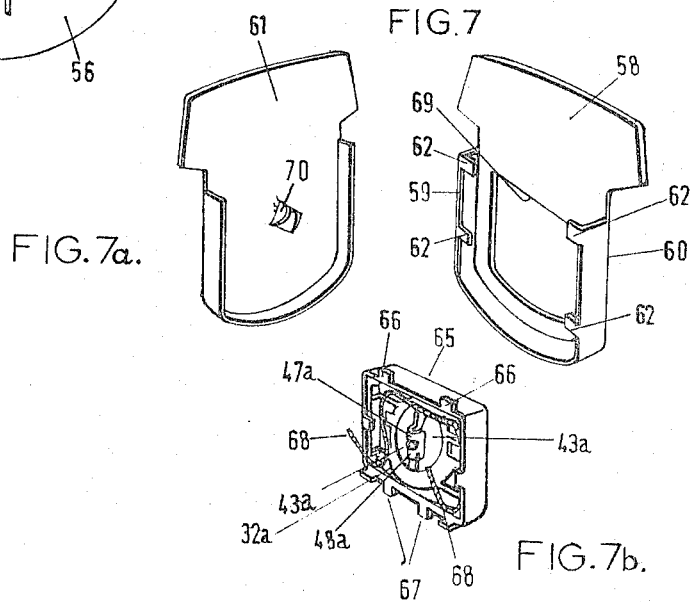

United States Patent Office 3,279,226
Patented Oct. 18, 1966

3,279,226
FASTENERS FOR BOXES AND THE LIKE
William Ernest Chance, Birmingham, England, assignor to C. W. Cheney & Son Limited, Birmingham, England, a British company
Filed Oct. 8, 1964, Ser. No. 402,515
Claims priority, application Great Britain, Apr. 7, 1964, 14,237/64
11 Claims. (Cl. 70—71)

This invention relates to fasteners for boxes and the like such as, for example, articles of luggage.

It is an object of the invention to provide a particularly neat and compact locking fastener which may be of the hasp type or may alternatively be of the type wherein a movable part of the fastener is passed through a staple loop and is locked by the disposition of a spring loaded part of the fastener in an erected position to prevent withdrawal of the movable part from the staple loop.

Hitherto it has been customary to mount the lock mechanism in the relatively stationary part of the fastener so that the relatively movable part engages with the relatively stationary part and is locked thereto, or, in the case of a fastener in which the relatively movable part passes through a staple loop, the lock has been part of the body on which the loop is mounted. Disadvantages of such customary fasteners are that the relatively stationary part cannot be made particularly slim if it has to accommodate a lock, but the difficulties of mounting an efficient lock in the relatively movable part without rendering the same cumbersome had dictated conventional designs.

In accordance with the invention a locking fastener has relatively stationary and relatively movable parts, the relatively movable part comprising a front cover member, means to snap engage said member with the relatively stationary part, a liner located in said member, and a lock mechanism including a locking plate partly disposed between said member and said liner, the locking plate having an integral projection for abutment with the relatively stationary part after said snap engagement to prevent disengagement of the fastener parts from one another.

Two embodiments of the invention will now be more particularly described, by way of example only, with reference to the accompanying drawings wherein:

FIGURES 1 and 1a are rear views of parts of a fastener-forming a first embodiment of the invention prior to inter-engagement of the relatively movable parts thereof;

FIGURE 2 is a view similar to that of FIGURE 1 during such interengagement, the fastener being unlocked;

FIGURE 3 is a view similar to that of FIGURE 2, the fastener being locked;

FIGURES 4 and 4a are front perspective views of the parts of the fastener shown in FIGURES 1–3 prior to interengagement;

FIGURES 5 and 5a are perspective views of two components of the fastener shown in FIGURES 1–4;

FIGURE 6 is a front perspective view of a fastener forming a second embodiment of the invention prior to interengagement of the relatively movable parts thereof; and FIGURES 7, 7a, and 7b are perspective views of components of some parts of the fastener shown in FIGURE 6.

Referring initially to FIGURES 1–5 of the drawings, the fastener shown therein comprises a relatively stationary part 10 which is an anchorage plate for fixing to the body of a suitcase (not shown) or the like adjacent its open mouth, and a relatively movable part 11 for fixing to the lid of the suitcase so as to interengage with the anchorage plate 10 when the lid is closed. The relatively movable part 11 comprises an attachment plate 12 and front cover member 13.

The anchorage plate 10 consists of a generally rectangular metal pressing having a dowel-like projection 14 rounded off in section extending from the centre of one longitudinal edge of the plate 10, the latter having a peripheral skirt 15. The plate 10 is formed with an approximately central oval aperture 16 extending into and having its major axis passing symmetrically through the dowel 14, and being flanked by pieercings 17 for a pair of fixing screws or rivets (not shown). A depression 18 of semicircular cross-section is formed in the dowel 14 and lies along said major axis connecting the oval aperture 16 with the outer end of the dowel 14.

The attachment plate 12 is a metal pressing and has a rectangular portion 19 of which one longitudinal edge remote from the anchorage plate 10 is extended and widened out into a knuckle portion 20 with end flanges 21 and a side flange 22. The other longitudinal edge has an elongated semicircular part 23 complementary to and for partial overlapping of the dowel 14. The remainder of the plate 12 has a peripheral skirt 24, and the plate 12 has a pair of piercings 25 for receiving fixing screws or rivets (not shown).

The front cover member 13 is also a metal pressing and is generally rectangular with a peripheral skirt 26 along three of its edges. The front cover member 13 is hinged to the attachment plate 12 through a hinge pin 27 extending between the ends of the skirt 26, through the end flanges 21 and along the interior of the knuckle portion 20. A torsion spring 28 is wound about the hinge pin with one end 29 pressing against the interior of the portion 19 of the attachment plate 12, and the other end 30 held towards the cover member 13 by a tab 31 extending inwardly from the edge of the skirt 26. The spring 28 thereby urges the cover member 13 into a closed position covering the attachment plate, and the cover member 13 is dimensioned such that, as described below, when the dowel 14 is received in the part 23 on the attachment plate 12, the cover member 13 also covers the anchorage plate 10 with the skirt 26 disposed therearound.

A metal pressing which is a liner 32 is held in the front cover member 13 by the tab 31, by a pair of further opposed tabs 33 bent inwardly from the skirt 26, and by the disposition of a marginal portion 34 behind the knuckle portion 20. The liner 32 has a pair of opposed side walls 35 through which it is maintained in position seating on the internal surface of the front cover member 13 by the tabs. The liner 32 is formed with two sets of longitudinal stiffening ribs 36 and with a central circular aperture 37. The aperture 37 is surrounded by an annular portion 38 raised away from the front cover member 13. The annular portion 38 is of doubled width at 39 through an arc of about 180° symmetrically facing the marginal portion 34, and terminates at each end in a corresponding one of two rectangular perforations 40 and 41. The cover member 13 opposite the hinge pin 27 is extended outwardly as at 42 with the liner 32 projecting into this extension 42, and the skirt 26 is narrowed around this extension to form a camming surface mentioned below.

A locking plate 43, also a metal pressing, has an annular flange 44 therearound sandwiched between the liner 32 and the cover member 13, said flange 44 being rotatably disposed in the annular portion 38. The flange 44 has a radially outwardly projecting lug 45 for passage around the part 39 between the perforations 40 and 41, said lug 45 carrying a dimple 46 for snap engagement into either of the perforations 40 or 41. The locking plate 43 is slightly domed within the flange 44 through the aperture 37 and is formed with an extension 47 projecting centrally from the plate 43 towards the open face of the cover member. The extension 47 is formed integrally with a radial projection 48.

A domed key locating pressing 49 is sandwiched between the locking plate 43 and the front cover member 13, and projects through a circular hole 50 in the front cover member 13. The circular hole 50 has a rectangular extension 51 at its edge facing the extension 42, and a further extension 51 diametrically opposed to the first across the hole 50. The extensions 51 permit the insertion and removal of a lock operating key through a slot in the key locating pressing 49, said key being able to pass into the extension 47 to rotate the locking plate 43 and the pressing 49 through an arc of 180° against the friction produced against the dimple 46. The rotation is limited at either end by the snap engagement of the dimple 46 into one of the perforations 40 or 41, this holding the locking plate 43 in position until the next key actuation.

In use, with the locking plate 43 in the unlocked position, as shown in FIGURES 1 and 2, i.e. the extension 47 on the locking plate 43 projecting away from the extension 42 on the cover member, the relatively movable part 11 on the lid of a suitcase is brought towards the relatively stationary part 10 on the body of the suitcase. As the camming surface on the extension 42 on the cover plate member 13 contacts the dowel 14 on the anchorage plate 10, the rounded-off nose of the dowel 14 co-operates in cam action to cause the member 13 to hinge about the pin 27 sufficiently to allow the member 13 to ride over the anchorage plate 10. When the front cover member 13 reaches the position shown in FIGURE 2 with the extension 42 past the anchorage plate 10, the spring 28 snaps the member 13 into a position enclosing the plate 10, the extension 47 and projection 48 from the locking plate 43 passing through the oval aperture 16. The depression 18 facilitates passage of the extension 47 to the aperture 16. In the snap engaged position of the front cover member 13 with the anchorage plate 10 the axis of rotation of the locking plate 43 is located on the side of the centre of the aperture 16 away from the dowel 14, and the projection 48 just clears the edge of the aperture 16 adjacent the dowel 14. Consequently key-rotation of the locking plate 43 to carry the dimple from perforation 40 to 41 takes the projection 48 through 180° and beyond the edge of the aperture 16 as can be seen in FIGURE 3. This prevents lifting of the extension 46 out of the aperture 16 and effectively locks the fastener. When the parts 10 and 11 are snap-engaged with one another, and are or not locked together, free play in the fastener is limited by engagement of the skirt 26 around the anchorage plate 10, and by engagement of the dowel 14 in the elongated semicircular part 23 in the attachment plate 12.

Referring now to FIGURES 6 and 7 of the drawings, the fastener 55 shown therein is very similar to that described above in that it includes a practically identical lock mechanism. Consequently the parts in this fastener 55 identical to parts described above have been given the same reference numerals with the suffix a.

The fastener 55 comprises a relatively stationary anchorage plate 56 carrying a staple loop 57, and a relatively movable part comprising a front plate 58 with a peripheral flange 59 around a portion 60 of the plate 58 for projection from the lid of a suitcase, and a back plate 61 of similar shape and flange to that of the front plate 58. The plates 58 and 61 are fixed together by tabs 62 extending from the edge of the flange 59, and so define a cavity in which is located a front cover member 63.

The front cover member 63 has a peripheral flange 64 along the edge 65 remote from the free end of the front plate 58, and along the two edges adjacent the edge 65. Two tabs 66 project outwardly from the flange 64 and two further tabs 67 project from the edge of the member 63 opposite the edge 65. The member 63 houses a hairpin-like spring 68 for urging said member 63 through a complementarily shaped aperture 69 in the front plate 58, the tabs 66 and 67 engaging with the interior margins of the aperture 69. Thus the member 63 can pivot about the tabs 67 with the tabs 66 limiting the outward pivoting movement.

The front cover member 63 houses a lock mechanism which is practically identical to that shown in FIGURES 1–5, and comprises a liner 32a, a locking plate 43a, and a domed key locating pressing 49a. The locking plate 43a includes an extension 47a and a projection 48a therefrom rotatable through a fixed arc of 180° by key operation, snap engagement of a dimple in either one of two perforations 40a and 41a limiting this rotation as before. When the projection 48a is in the locked position it is arranged to abut a lug 70 upstanding from the back plate 61, and so prevent depression of the front cover member 63 through the aperture 69. When the projection 48a is in the unlocked position it is clear of the lug 70 and can be depressed alongside said lug 70.

In use the parts of the fastener 55 are engaged with one another by passage of the front and back plates 58 and 61, and the cover member 63, through the staple loop 57 until the edge 65 clears the loop 57. The member 63 is then urged outwardly by the spring 68 to prevent inadvertent withdrawal of the member 63 through the loop 57. In this position the fastener can be locked as desired. Withdrawal of the member 63 can only be effected after manual depression thereof.

In the fasteners described above the use of the lock mechanism described enables a slimmer fastener to be used than before known, leading to beneficial improvements in appearance.

I claim:

1. A locking fastener having relatively stationary and relatively movable parts, the relatively movable part comprising a front cover member, a liner located in said member, self contained camming means to snap into overlapping engagement said member with the relatively stationary part, and a lock mechanism including a locking plate partly disposed between said member and said liner, the locking plate having an integral projection for abutment with the relatively stationary part after said snap engagement to prevent disengagement of the fastener parts from one another.

2. A locking fastener according to claim 1 wherein the locking plate is turnable by key operation to take the integral projection into or out of position for said abutment, and is located in an aperture in the liner with an annular flange sandwiched between the cover member and the liner.

3. A locking fastener according to claim 2 wherein said turning of the locking plate is through a maximum predetermined angle of approximately 180° defined by limit means.

4. A locking fastener according to claim 3 wherein said limit means comprises a dimple on the annular flange engageable with either of two perforation in the liner approximately diametrically opposed across the aperture therein.

5. A locking fastener according to claim 4 wherein the liner is annularly deformed away from the cover member about the aperture to accommodate the annular flange on the locking plate, and is additionally deformed to permit passage of the dimple against friction through a fixed arc between the perforations.

6. A locking fastener according to claim 5 wherein a domed key locating pressing is seated against the locking plate within the annular flange between the locking plate and the front cover member, the dome projecting through a circular hole in said front cover member.

7. A locking fastener according to claim 6 wherein the liner is trapped in position by at least one tab extending from the front cover member, and in turn traps the locking plate and domed key locating pressing against the front cover member.

8. A locking fastener according to claim 7 wherein the front cover member is hinged to an attachment plate so as to cover the attachment plate and the relatively stationary part when snap engaged with the latter.

9. A locking fastener according to claim 8 wherein the relatively stationary part is formed with a non-circular hole through which can pass the integral projection when unlocked, locking of the lock mechanism preventing withdrawal of the projection by abutment thereof with a part of the stationary part adjacent said noncircular hole.

10. A locking fastener according to claim 7 wherein the front cover member is hinged to a front plate on the relatively movable part and is spring urged to have one side remote from the free end of the front plate upstanding therefrom in an erected position, whereby said free end can be inserted into and passed through a staple loop on the relatively stationary part, followed by the front cover member, the front cover member being depressed by the staple loop during passage thereunder, and then returning to the erected position with said one side preventing withdrawal of the front plate from the staple loop.

11. A locking fastener according to claim 10 wherein the front plate is secured to a back plate having a lug upstanding therefrom towards the locking plate, the integral projection abutting against said lug when locked to prevent depression of the front cover member, and being clear of said lug when not locked.

References Cited by the Examiner

UNITED STATES PATENTS

| | | | |
|---|---|---|---|
| 320,036 | 6/1885 | Adams | 70—70 |
| 1,891,217 | 12/1932 | Komenak | 70—71 |
| 2,280,648 | 4/1942 | Jacobi | 70—71 |
| 2,798,371 | 7/1957 | Gehre | 70—73 |
| 3,169,788 | 2/1965 | Slan | 70—70 X |
| 3,188,839 | 6/1965 | Humphries | 70—70 |

FOREIGN PATENTS

| | | |
|---|---|---|
| 927,376 | 4/1947 | France. |
| 669,015 | 3/1952 | Great Britain. |
| 365,631 | 12/1962 | Switzerland. |

BOBBY R. GAY, *Primary Examiner.*

PATRICK A. CLIFFORD, *Examiner.*